(12) United States Patent
Mills et al.

(10) Patent No.: US 7,925,005 B2
(45) Date of Patent: Apr. 12, 2011

(54) LONGITUDINAL BALANCE CALIBRATION FOR A SUBSCRIBER LINE INTERFACE CIRCUIT

(75) Inventors: Michael J. Mills, Austin, TX (US); Marius Goldenberg, Austin, TX (US); Alan F. Hendrickson, Austin, TX (US); Ion C. Tesu, Austin, TX (US); Jiangtao Yi, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 354 days.

(21) Appl. No.: 11/586,425

(22) Filed: Oct. 23, 2006

(65) Prior Publication Data

US 2008/0111584 A1    May 15, 2008

(51) Int. Cl.
*H04M 1/00* (2006.01)
*H04M 9/00* (2006.01)

(52) U.S. Cl. .................. 379/404; 379/399.01; 379/402

(58) Field of Classification Search ...... 379/399.01–413
See application file for complete search history.

(56) References Cited

U.S. PATENT DOCUMENTS

| | | | | |
|---|---|---|---|---|
| 4,600,811 A | * | 7/1986 | Hayashi et al. | 379/345 |
| 4,794,349 A | * | 12/1988 | Senderowicz et al. | 330/253 |
| 4,982,426 A | * | 1/1991 | Jakab | 379/402 |
| 5,166,635 A | * | 11/1992 | Shih | 330/253 |
| 5,315,653 A | * | 5/1994 | Siligoni et al. | 379/413 |
| 5,329,585 A | * | 7/1994 | Susak et al. | 379/399.01 |
| 5,473,666 A | * | 12/1995 | Szczebak et al. | 379/3 |
| 5,959,475 A | * | 9/1999 | Zomorrodi | 327/112 |
| 5,990,737 A | * | 11/1999 | Czarnul et al. | 330/69 |
| 6,137,189 A | * | 10/2000 | Youngblood | 307/30 |
| 6,181,204 B1 | * | 1/2001 | Smith et al. | 330/261 |
| 6,498,849 B1 | * | 12/2002 | Hellberg et al. | 379/399.01 |
| 6,580,760 B1 | * | 6/2003 | Larsen | 375/257 |
| 6,587,559 B1 | * | 7/2003 | Bartkowiak | 379/386 |
| 6,675,117 B2 | * | 1/2004 | Adam et al. | 702/106 |
| 6,931,108 B2 | * | 8/2005 | Ludeman | 379/93.05 |
| 7,130,414 B2 | * | 10/2006 | Enriquez et al. | 379/399.01 |
| 7,298,837 B2 | * | 11/2007 | Patterson | 379/399.01 |
| 7,453,896 B1 | * | 11/2008 | Bass | 370/403 |
| 2001/0036262 A1 | * | 11/2001 | Emericks | 379/399.01 |
| 2002/0070770 A1 | * | 6/2002 | Ferianz | 327/108 |
| 2002/0101980 A1 | * | 8/2002 | Ayoub et al. | 379/399.01 |
| 2003/0072436 A1 | * | 4/2003 | Eckhoff et al. | 379/399.01 |
| 2004/0263214 A1 | * | 12/2004 | Patterson | 327/65 |
| 2005/0147234 A1 | * | 7/2005 | Zhou | 379/399.01 |
| 2005/0152533 A1 | * | 7/2005 | Zhou | 379/399.01 |
| 2005/0220293 A1 | * | 10/2005 | Hein et al. | 379/413 |
| 2005/0281403 A1 | * | 12/2005 | Hein et al. | 379/399.01 |

* cited by examiner

*Primary Examiner* — Rexford N Barnie
*Assistant Examiner* — Matthew C Tabler
(74) *Attorney, Agent, or Firm* — Davis & Associates; William D. Davis

(57) ABSTRACT

A method of calibrating longitudinal balance for a subscriber line interface circuit includes providing a first and a second driver of a differential driver pair for driving a subscriber line. An output of each of the first and second drivers is coupled to a common output. The common output is coupled to an input of the first driver. The gain of at least one of the first and second drivers is adjusted until a calibration signal (V1) present at the input of the first driver is substantially the same as a calibration signal (V2) present at the input of the second driver.

24 Claims, 18 Drawing Sheets

US 7,925,005 B2

LONGITUDINAL BALANCE CALIBRATION FOR A SUBSCRIBER LINE INTERFACE CIRCUIT

FIELD OF THE INVENTION

This invention relates to methods and apparatus for performing longitudinal balance calibrations for differential signaling devices such as a subscriber line interface circuit.

BACKGROUND

A subscriber line interface circuit typically utilizes differential mode signaling when communicating with subscriber equipment such as a telephone. Differential mode signaling offers a number of practical advantages. For example, individual signals for each of the tip and ring lines need only have half the amplitude of the differential signal.

In order for the differential signaling to function appropriately, the differential signaling device requires longitudinal balance for the differential mode circuitry. Asymmetries between the drivers for each line may impair the ability to reject common mode signals. In particular, common mode signals will leak into the differential mode signals thus degrading of the performance of the differential circuitry.

In order to improve the performance of the differential circuitry, the common mode feedback circuit may be designed as an adjustable component of the differential circuitry. The common mode feedback circuit is adjusted or calibrated to maximize rejection of the common mode component of any signal presented to a differential node pair of the differential circuitry.

SUMMARY OF THE INVENTION

A method of calibrating longitudinal balance for a subscriber line interface circuit includes providing a first and a second driver of a differential driver pair for driving a subscriber line. An output of each of the first and second drivers is coupled to a common output. The common output is coupled to an input of the first driver. The gain of at least one of the first and second drivers is adjusted until a calibration signal (V1) present at the input of the first driver is substantially the same as a calibration signal (V2) present at the input of the second driver.

An apparatus for calibrating a subscriber line interface circuit longitudinal balance includes a first and a second driver of a differential driver pair for driving the subscriber line. An output of each of the first and second drivers is coupled to a common output. The common output is coupled to an input of the first driver. A processor is coupled to adjust a gain of at least one of the first and second drivers until a calibration signal (V1) present at the input of the first driver is substantially the same as a calibration signal (V2) present at the input of the second driver.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
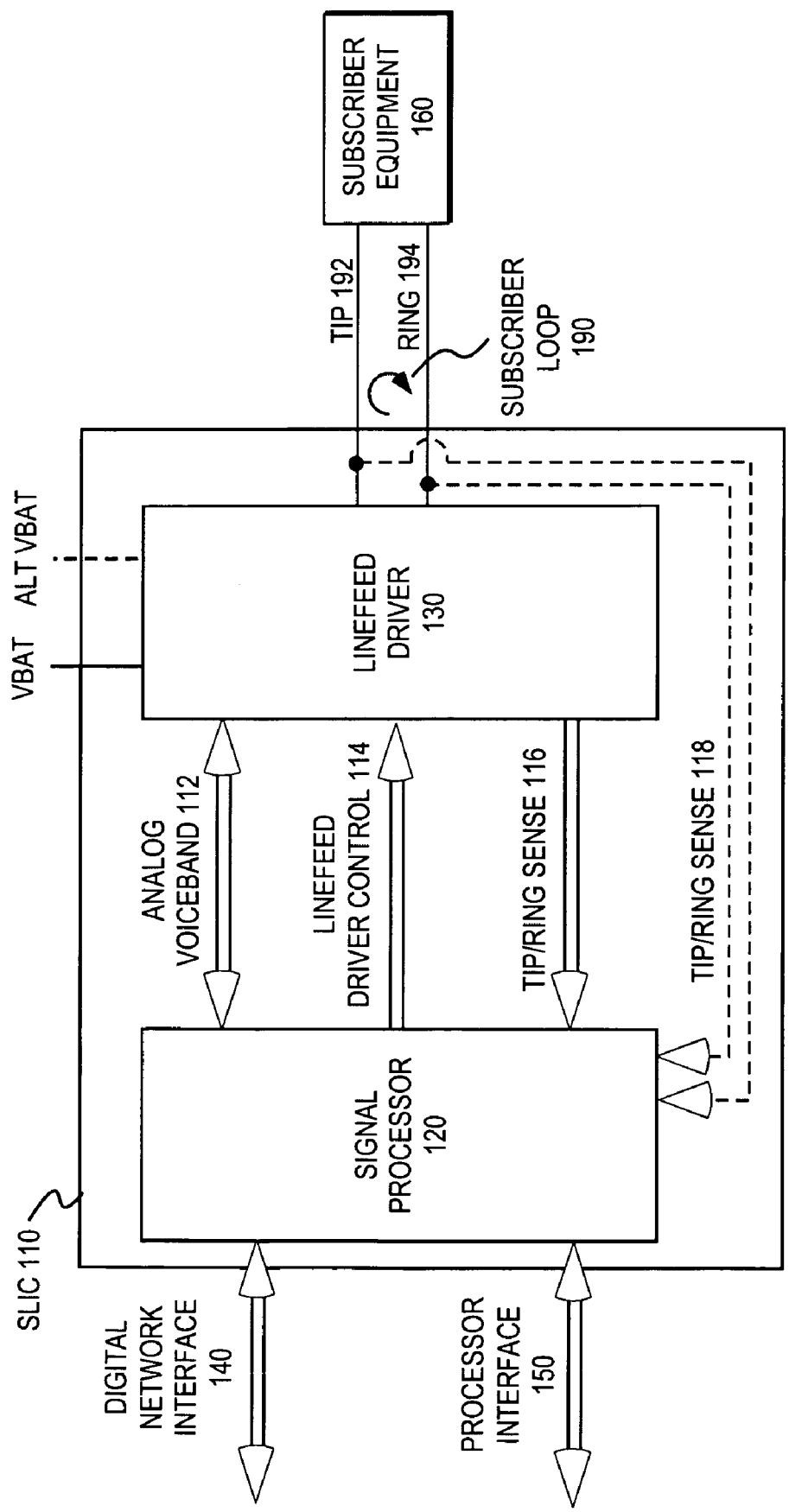
FIG. 1 illustrates one embodiment of a subscriber line interface circuit.

FIG. 1 illustrates one embodiment of a subscriber line interface circuit 110 associated with plain old telephone services (POTS) telephone lines. The subscriber line interface circuit (SLIC) provides an interface between a digital switching network of a local telephone company central exchange and a subscriber line comprising a tip 192 line and a ring 194 line. A subscriber loop 190 is formed when the subscriber line is coupled to subscriber equipment 160 such as a telephone.

The subscriber loop 190 communicates analog data signals (e.g., voiceband communications) as well as subscriber loop "handshaking" or control signals. The subscriber loop state is often specified in terms of the tip 192 and ring 194 portions of the subscriber loop.

The SLIC is typically expected to perform a number of functions often collectively referred to as the BORSCHT requirements. BORSCHT is an acronym for "battery feed," "overvoltage protection," "ringing," "supervision," "codec,"

"hybrid," and "test." The term "linefeed" will be used interchangeably with "battery feed". Modern SLICs may have battery backup, but the supply to the subscriber line is typically not actually provided by a battery.

The ringing function, for example, enables the SLIC to signal the subscriber equipment 160. In one embodiment, subscriber equipment 160 is a telephone. Thus, the ringing function enables the SLIC to ring the telephone.

In the illustrated embodiment, the BORSCHT functions are distributed between a signal processor 120 and a linefeed driver 130. Signal processor 120 is responsible for at least the ringing control, supervision, codec, and hybrid functions. Signal processor 120 controls and interprets the large signal subscriber loop control signals as well as handling the small signal analog voiceband data and the digital voiceband data.

In one embodiment, signal processor 120 is an integrated circuit. The integrated circuit includes sense inputs for both a sensed tip and a sensed ring signal of the subscriber loop. The integrated circuit generates subscriber loop linefeed driver control signal in response to the sensed signals. The signal processor has relatively low power requirements and can be implemented in a low voltage integrated circuit operating in the range of approximately 5 volts or less.

Signal processor 120 receives subscriber loop state information from linefeed driver 130 as indicated by tip/ring sense 116. The signal processor may alternatively directly sense the tip and ring as indicated by tip/ring sense 118. This information is used to generate linefeed driver control 114 signals for linefeed driver 130. Analog voiceband 112 data is bi-directionally communicated between linefeed driver 130 and signal processor 120. In an alternative embodiment, analog voiceband signals are communicated downstream to the subscriber equipment via the linefeed driver but upstream analog voiceband signals are extracted from the tip/ring sense 118.

SLIC 110 includes a digital network interface 140 for communicating digitized voiceband data to the digital switching network of the public switched telephone network (PSTN). The SLIC may also include a processor interface 150 to enable programmatic control of the signal processor 120. The processor interface effectively enables programmatic or dynamic control of battery control, battery feed state control, voiceband data amplification and level shifting, longitudinal balance, ringing currents, and other subscriber loop control parameters as well as setting thresholds including ring trip detection and off-hook detection threshold.

Linefeed driver 130 maintains responsibility for battery feed to tip 192 and ring 194. The battery feed and supervision circuitry typically operate in the range of 40-75 volts. In some implementations the ringing function is handled by the same circuitry as the battery feed and supervision circuitry. In other implementations, the ringing function is performed by separate higher voltage ringing circuitry (75-150 $V_{rms}$).

Linefeed driver 130 modifies the large signal tip and ring operating conditions in response to linefeed driver control 114 provided by signal processor 120. This arrangement enables the signal processor to perform processing as needed to handle the majority of the BORSCHT functions. For example, the supervisory functions of ring trip, ground key, and off-hook detection can be determined by signal processor 120 based on operating parameters provided by tip/ring sense 116.

The linefeed driver receives a linefeed supply VBAT for driving the subscriber line for SLIC "on-hook" and "off-hook" operational states. An alternate linefeed supply (ALT VBAT) may be provided to handle the higher voltage levels (75-150 Vrms) associated with ringing.

Figure 2:
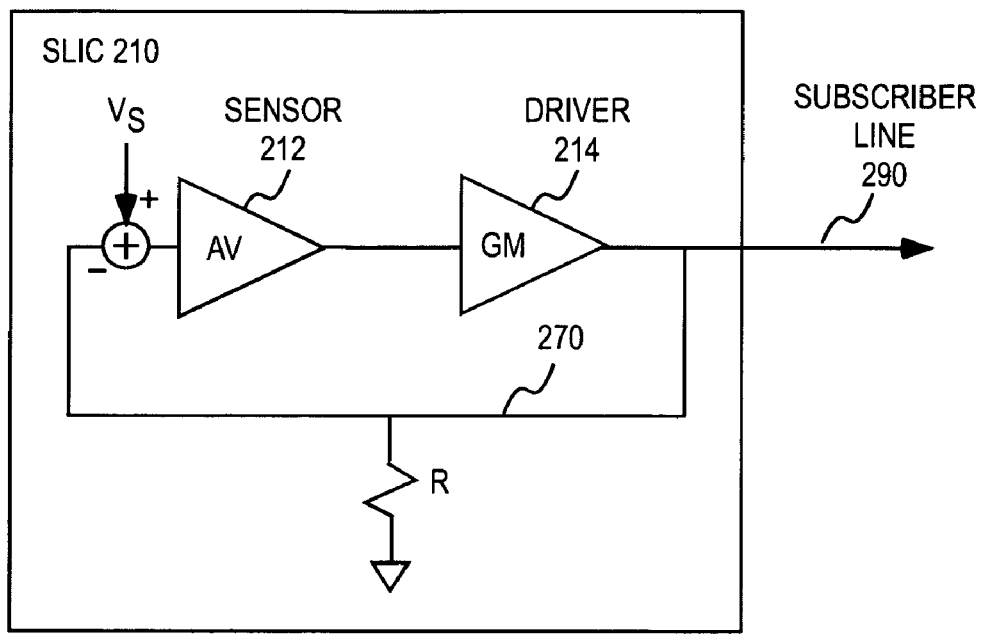
FIG. 2 illustrates one embodiment of a model for SLIC control of a subscriber line.

FIG. 2 illustrates one embodiment of a model for SLIC control of a subscriber line. The SLIC 210 includes a sensor 212 and a driver 214 for driving the subscriber line 290. A feedback loop 270 is utilized to ensure that the unloaded (i.e., open circuit) subscriber loop signal corresponds to $V_5$. Although illustrated without regard to the differential nature of the signaling, subscriber line communications are typically differential in nature. A sensor and driver component exists for each line (e.g., tip and ring) of the differential signaling system. The sensor and driver combination should be calibrated for each of the tip and ring lines for longitudinal balance. In one embodiment, only the driver 214 is capable of being calibrated.

Figure 3:
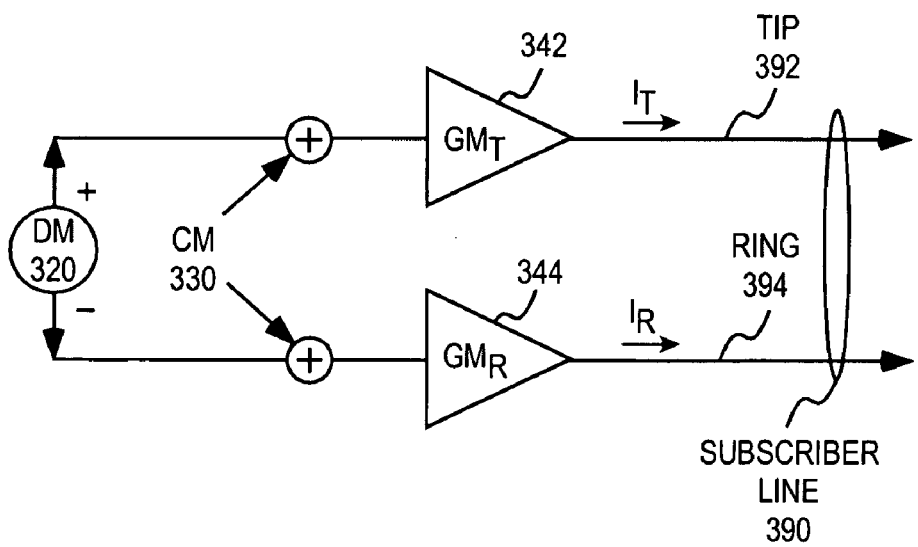
FIG. 3 illustrates a differential driver pair for a subscriber line.

FIG. 3 illustrates the driver for each of the tip 392 and ring 394 lines of the subscriber line 390. $GM_T$ 342 represents the tip driver. $GM_R$ 344 represents the ring driver. The tip and ring drivers may be subjected to differential mode (DM 320) signals and common mode (CM 330) signals. The tip and ring currents are described as follows:

$$I_T = GM_T \cdot \left(CM + \frac{DM}{2}\right)$$

$$I_R = GM_R \cdot \left(CM - \frac{DM}{2}\right)$$

If Z represents the load imposed by the subscriber equipment, then the differential signal $V_{TR}$ appearing across Z is as follows:

$$V_{TR} = Z \cdot \left(GM_T \cdot \left(CM + \frac{DM}{2}\right) - GM_R \cdot \left(CM - \frac{DM}{2}\right)\right)$$

If $GM_T$ and $GM_R$ are matched such that $GM_T = GM_R = GM$, then $$V_{TR} = Z \cdot \left(GM \cdot \left(CM + \frac{DM}{2}\right) - GM \cdot \left(CM - \frac{DM}{2}\right)\right)$$

$$= Z \cdot GM \cdot \left(\left(CM + \frac{DM}{2}\right) - \left(CM - \frac{DM}{2}\right)\right)$$

$$= Z \cdot GM \cdot DM$$

As long as $GM_R$ and $GM_T$ are matched, the common mode signal is eliminated from the differential signal. If $GM_R$ and $GM_T$ are not matched, then the common mode signal will not be eliminated and signaling will be degraded as a result of the mismatch. The amount of degradation is related to the amount of mismatch. "Longitudinal balance" is a measure of the common mode-to-differential mode conversion due to the mismatch.

Figure 4:
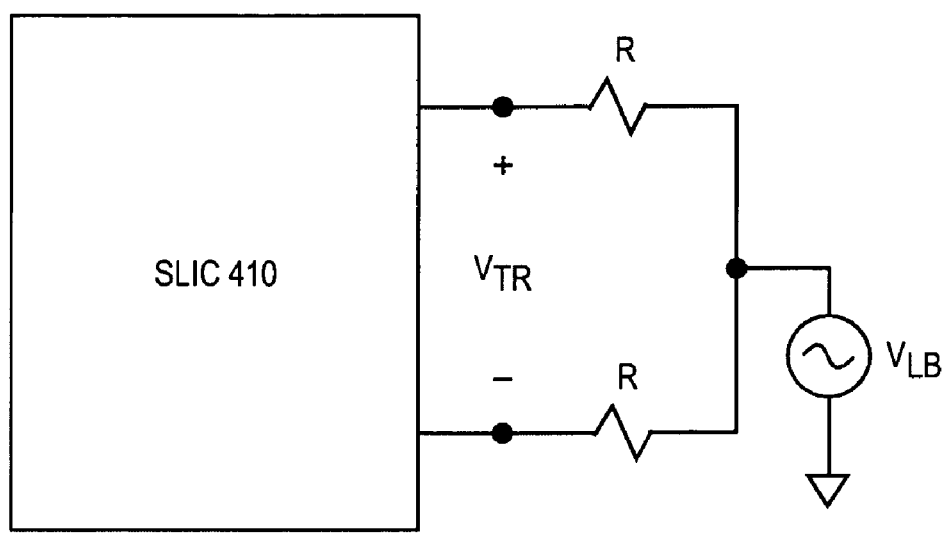
FIG. 4 illustrates one embodiment of a circuit for measuring longitudinal balance.

FIG. 4 illustrates one embodiment of a circuit for calibrating longitudinal balance of a SLIC 410. The load is typically specified as a 600Ω differential load, thus R=300Ω. A signal source, $V_{LB}$ is applied as illustrated and $V_{TR}$ is measured. Ideally, a common mode signal such as $V_{LB}$ should not produce any differential mode signal, $V_{TR}$. However, due to imperfections $V_{LB}$ will impact $V_{TR}$. The common mode rejection ratio (CMRR) is calculated as follows:

$$CMRR = 20\text{Log}\left(\frac{V_{TR}}{V_{LB}}\right)$$

Preferably, $$\frac{V_{TR}}{V_{LB}} \le .01$$

such that CMRR=−40 dB or less. A typical range might be CMRR≦−54 to −60 dB. This would require $$\frac{V_{TR}}{V_{LB}} \le .002,$$

for example. The CMRR is also referred to as the longitudinal-to-metallic balance (LB).

Figure 5:
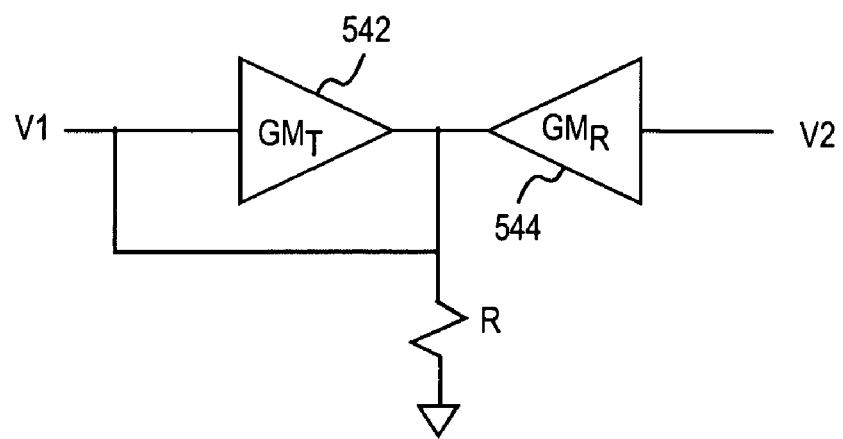
FIG. 5 illustrates circuitry for calibrating longitudinal balance.

FIG. 5 illustrates circuitry for calibrating longitudinal balance. The tip 542 and ring 544 drivers have their outputs coupled together to form a common output. The common output is fed back to the input (V1) of one of the tip and ring drivers. A calibration signal is applied to the input (V2) of the other driver. The signals V1 and V2 are compared. The relationship between V1, V2, $GM_T$, and $GM_R$ is as follows:

$$\frac{V1}{V2} = \frac{GM_R \cdot R}{1 - GM_T \cdot R}$$

Adjusting $GM_T$ or $GM_R$ until |V1|≈|V2| will set $GM_T$≈$GM_R$, as long as $GM_T$·R>>1 (i.e., $GM_T$·R is much greater than 1). Due to the differential nature of the signaling, the ac component of V1 and V2 will have a 180° phase difference. In one embodiment, |V1|≈|V2| implies that the a.c. root mean square (rms) values of V1 and V2 are substantially the same (i.e., irrespective of phase differences or dc offsets between V1 and V2).

Figure 6:
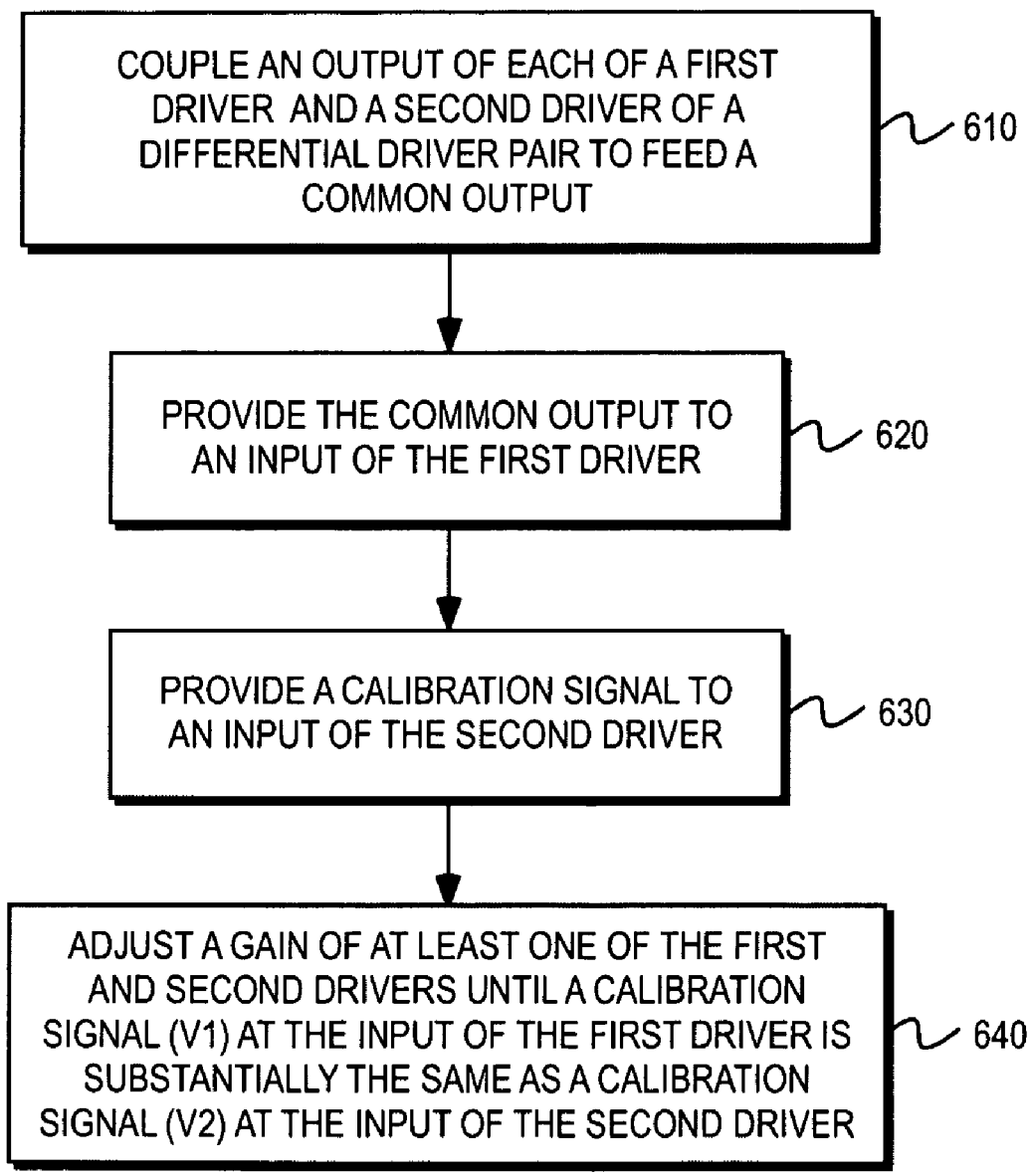
FIG. 6 illustrates one embodiment of a method of calibrating subscriber line drivers for longitudinal balance.

FIG. 6 illustrates one embodiment of a method of calibrating subscriber line drivers for longitudinal balance. The output of each of a first driver and a second driver of a differential driver pair are coupled together to feed a common output in step 610. The common output is provided to the input of the first driver of the pair in step 620. A calibration signal is applied to an input of the second driver in step 630. A gain of at least one of the drivers is varied until a calibration signal (V1) at the input of the first driver is substantially equal to a calibration signal (V2) at the input of the second driver in step 640.

Coupling the output of each of the first and second drivers of the subscriber line differential driver pair inherently requires disconnecting these primary drivers from the subscriber line. An alternative approach is to use secondary first and second drivers that are matched to the primary first and second drivers as a result of the fabrication process. The secondary drivers are coupled and matched relative to each other as set forth in FIGS. 5-6. The primary drivers will then be matched relative to each other due to the matching between the corresponding primary and secondary drivers.

Scaled models may be used to save integrated circuit die area for the secondary driver set. For example, the secondary drivers may have a significantly reduced current carrying capability while having a gain identical to their primary driver counterparts and thus do not require the same amount of die area as the primary drivers.

Figure 7:
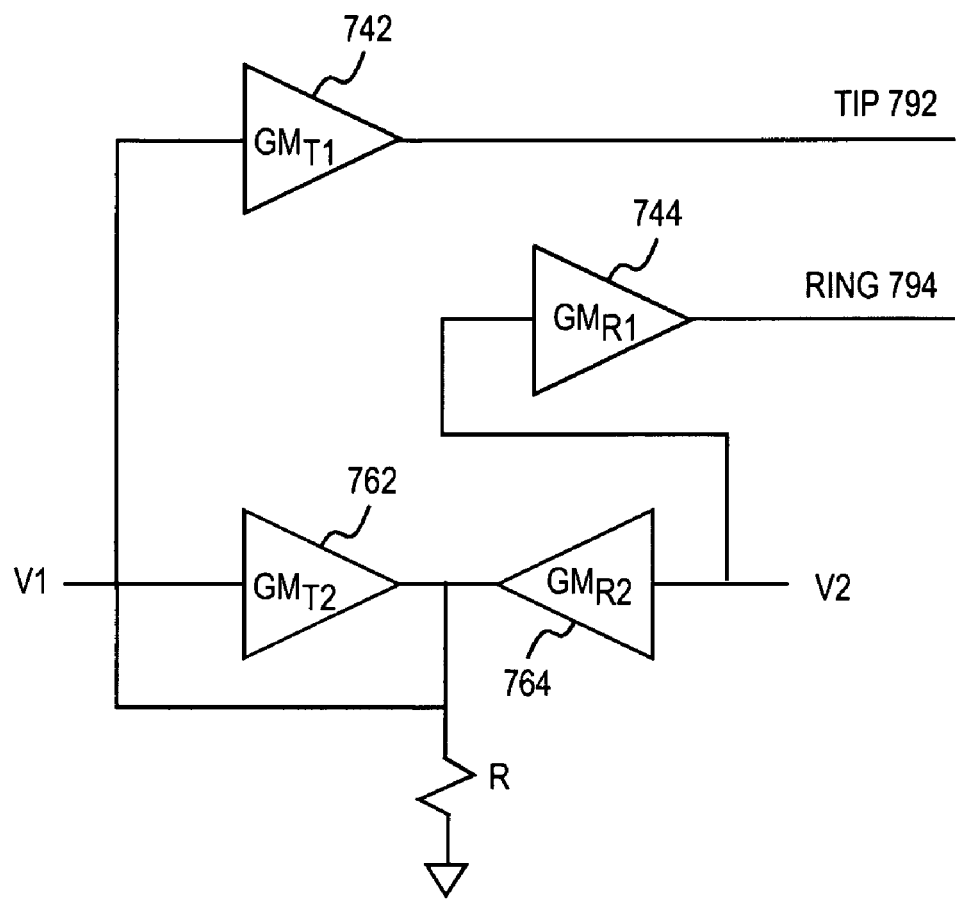
FIG. 7 illustrates calibration circuitry with secondary drivers for calibration.

FIG. 7 illustrates calibration circuitry utilizing secondary drivers 762, 764. In one embodiment, primary drivers 742, 744 remain coupled to the subscriber line during calibration. Alternatively, primary drivers 742, 744 may be de-coupled from the subscriber line to prevent artifacts from the calibration process from being communicated to the subscriber equipment.

Each secondary driver corresponds to one primary driver. Thus for example, secondary driver 762 corresponds to primary driver 742 and secondary driver 764 corresponds to primary driver 744. In one embodiment, the gain of each secondary driver is tied to that of its corresponding primary driver. Changes to the gain of a secondary driver are thus reflected in changes to the gain of the corresponding primary driver.

The secondary tip 762 and ring 764 drivers have their outputs coupled to feed a common output. The common output is fed back to the input of one driver (762). A calibration signal is applied to the input of the other driver (764). The gain of at least one of the tip and ring secondary drivers is adjusted until the calibration signal (V1) at the input of the secondary tip driver is substantially the same as the calibration signal (V2) at the input of the secondary ring driver (i.e., V1≈V2) at which point $GM_{T2}$≈$GM_{R2}$. Given that $GM_{T1} \propto GM_{T2}$ and $GM_{R1} \propto GM_{R2}$ (the proportionality factor ∝ between the primary and secondary drivers is the same for both tip and ring), this ensures that the primary drivers are calibrated such that $GM_{T1}$≈$GM_{R1}$. In one embodiment the proportionality factor is chosen such that $GM_{T1}=GM_{T2}$ and $GM_{R1}=GM_{R2}$.

Figure 8:
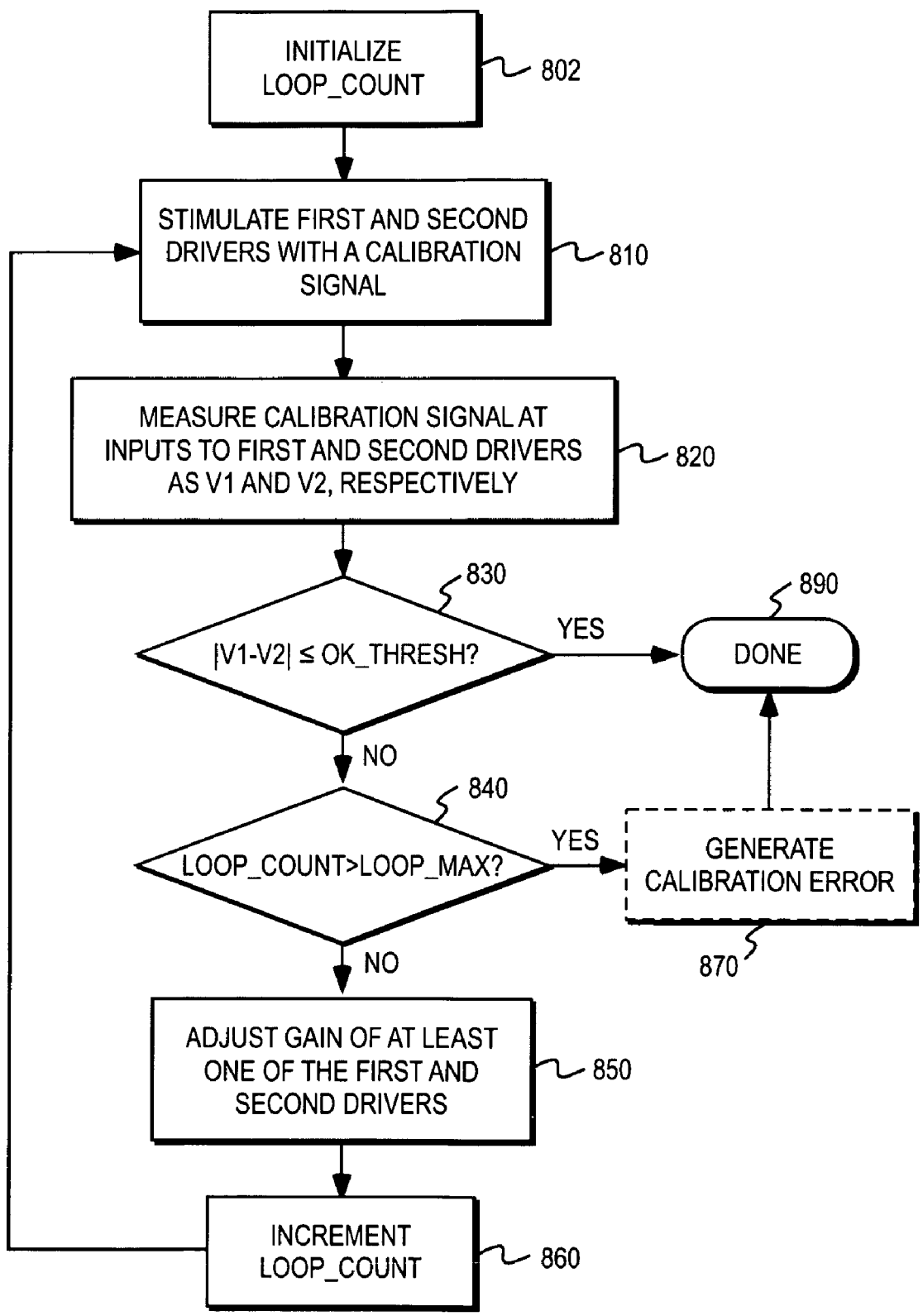
FIG. 8 illustrates one embodiment of a method of calibrating subscriber line drivers for longitudinal balance.

FIG. 8 illustrates one embodiment of a method for calibrating the drivers. The first and second drivers have their outputs coupled to feed a common output. The common output is fed back to the input of the first driver. A loop count is initialized in step 802. The first and second drivers are stimulated with a calibration signal in step 810 by providing the calibration signal to the input of the second driver. In one embodiment, the calibration signal is a sinusoid with a single dominant frequency of approximately 100 Hz.

In step 820, the calibration signal at the inputs to the first and second drivers is measured as V1 and V2, respectively. In one embodiment, this is accomplished by performing a spectral transform to the signals sensed at the inputs of the drivers. In one embodiment the spectral transform is a single point Discrete Fourier Transform (DFT). A Goertzel DFT is particularly efficient for computing a few DFT frequencies. In one embodiment, a Goertzel DFT is applied to compute V1 and V2, representing the spectral content of the input to the first and second drivers.

The use of transforms permits comparison of the relative magnitudes of the spectral components of the calibration signal present at the driver inputs. This approach also effectively permits a comparison of gain without regard to DC offset differences between the drivers.

Step 830 determines whether the difference between V1 and V2 is less than a pre-determined threshold, OK_THRESH. If so, then calibration is completed in step 890.

If the difference between V1 and V2 is not within the pre-determined threshold, OK_THRESH, then step 840 determines whether a maximum number of calibration attempts have taken place. If LOOP_COUNT exceeds the pre-determined maximum number of attempts, MAX_LOOP as determined in step 840, then a calibration error may optionally be generated in step 860 before the process terminates in step 890. If the maximum number of attempts has not been exceeded, then the gain of at least one of the first and second drivers is adjusted in step 850. If |V2|>|V1|, then the gain of the first driver may be decreased, the gain of the second driver may be increased, or both. Similarly, if |V1|>|V2| then the gain of the second driver may be increased, the gain of the first driver may be decreased, or both. The LOOP_COUNT is incremented in step 860 continuing.

Steps 810-860 are repeated until either the difference between V1 and V2 is acceptable or the number of attempts to calibrate exceeds a pre-determined count, MAX_LOOP as determined in step 850.

Figure 9:
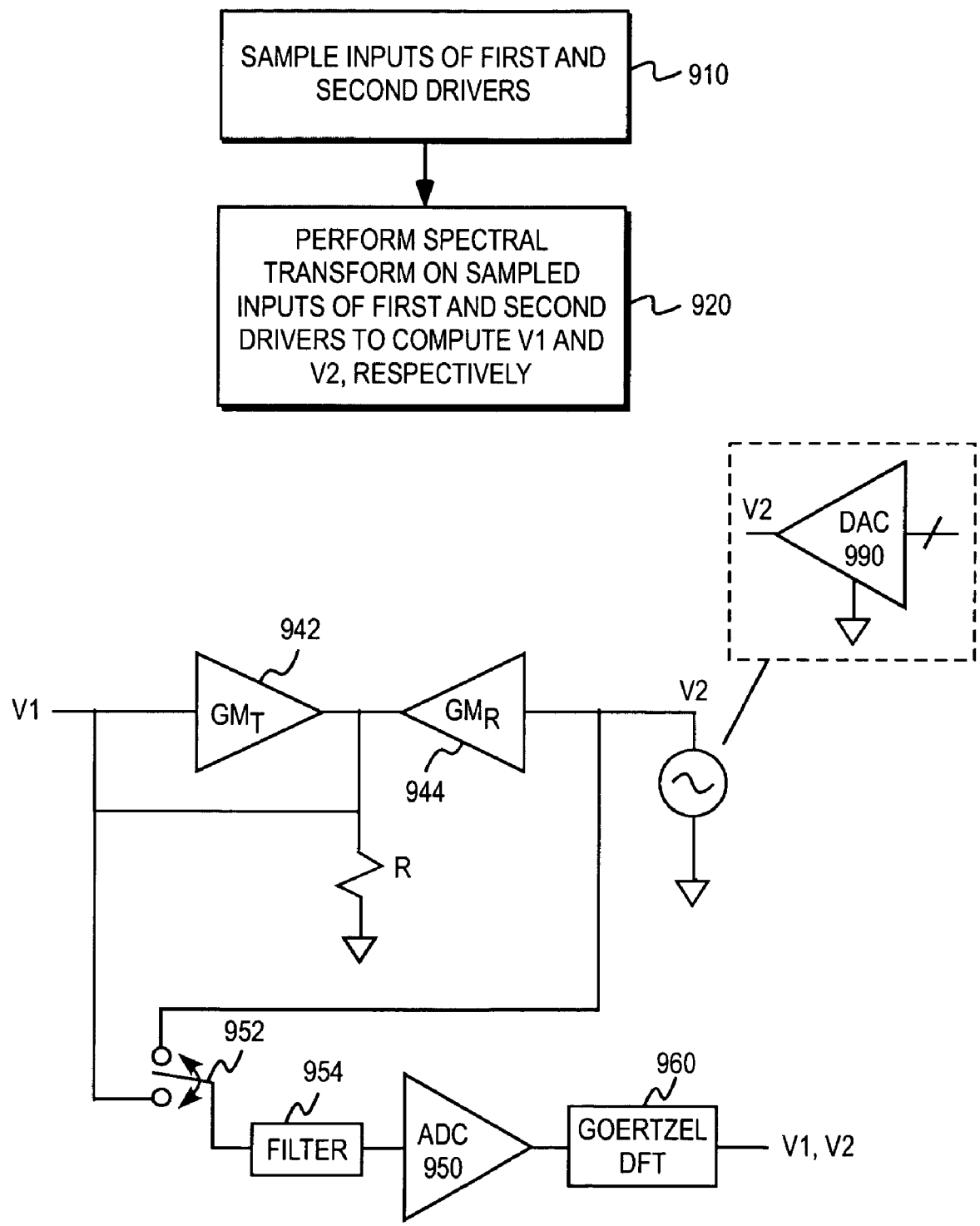
FIG. 9 illustrates one embodiment of a method of measuring calibration signal content.

FIG. 9 illustrates one embodiment the application of steps 810-820 in greater detail. The calibration signal is provided to the input of the second driver in order to stimulate the first and second drivers as indicated in step 810. In various embodiments, a digital-to-analog converter (DAC 990) residing on the signal processor generates the calibration signal (V2). In one embodiment, DAC 990 is the audio DAC otherwise utilized for communicating downstream voiceband communications from the SLIC to the subscriber equipment.

With respect to step 820, the inputs of the first and second drivers 942, 944 are sampled in step 910. In one embodiment a single analog-to-digital converter (ADC 950) is switched (952) to alternatively sample the inputs corresponding to V1 and V2. In one embodiment, the ADC 950 forms a portion of the signal processor 120. The ADC utilized by the signal processor for receiving upstream voiceband communications from the subscriber equipment may be utilized as ADC 950. The V1, V2 analog signals should be anti-aliased to remove frequencies exceeding half the sample rate of the ADC prior to the analog-to-digital conversion. Filter 954 is an anti-aliasing filter. Filter 954 may also serve to eliminate noise. In one embodiment filter 954 is a low pass anti-aliasing filter.

The spectral content of the sampled inputs may be compared to determine whether V1≈V2. In step 920, a spectral transform is performed on the sampled voltages. The spectral transform converts the sampled voltages from a time-based (t) function to a frequency-based (f) function (V1(t)→V1(f), V2(t)→V2(f)). In one embodiment, the spectral transform is a discrete Fourier transform (DFT). In one embodiment, the DFT is computed as a Goertzel DFT as illustrated by block 960.

A comparison of V1(f) and V2(f) may be used to determine whether the a.c. rms values of V1(t) and V2(t) are substantially equal (i.e., |V1|≈|V2|). In one embodiment, the value of V1(f) and V2(f) at a particular frequency are determinative of whether |V1|≈|V2|. For example, in one embodiment:

If |V1(f=100)−V2(f=100)|≤T, then |V1|≈|V2|

For purposes of the computation, the phase information of the Goertzel transform is discarded such that only the amplitudes are taken into consideration. Thus the expression above is simplified because V1(f), V2(f) are positive numbers.

In other words, if the absolute value of the difference between the spectral transforms of V1(t) and V2(t) evaluated at f=100 Hz is less than a pre-determined positive threshold, T, then |V1|≈|V2|. The choice of calibration signal frequency is determinative of the frequency for which V1(f) and V2(f) should be evaluated.

Although 100 Hz is the frequency evaluated for purposes of illustration, other frequencies may be utilized or necessitated by external issues. For example, 100 Hz is the second harmonic of 50 Hz which is utilized for electrical power transmission in many countries. To avoid extraneous noise from affecting the calibration, an alternative calibration frequency (e.g., 96 Hz) can be used. The choice of frequency tends to be bound by the frequency dependent nature of the gain and the desire to avoid extended sampling times. Frequencies susceptible to extraneous noise should be avoided. In various embodiments, f is chosen to generate a spectral component within a range of 60-320 Hz. Electrical power transmission frequencies and harmonics of those frequencies should be avoided. Thus in one embodiment, the calibration frequency is selected to be a frequency other than p·n where n is an integer greater than or equal to one (i.e., n∈{1, 2, 3, ...} for p∈{50 Hz, 60 Hz}.

Given that the determination of substantial equality may be made in the time domain or the frequency domain, as the context requires, the time or frequency dependent nature of the variables is omitted from the Figures. Signal processor 120 performs the spectral transform and determination of substantial equality in one embodiment.

Figure 10:
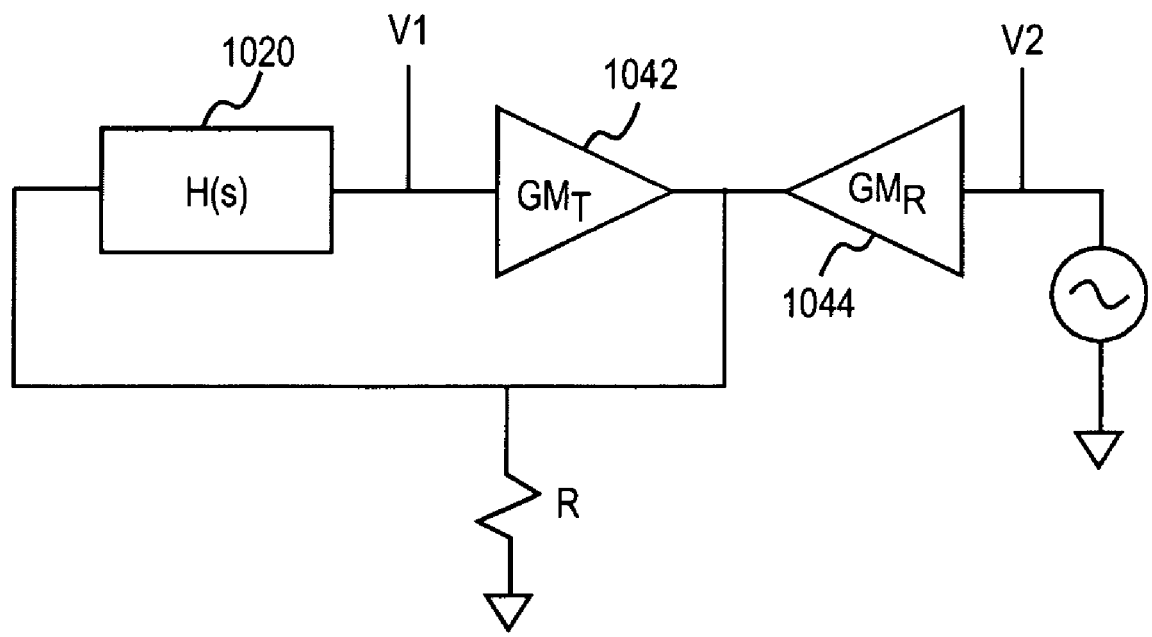
FIG. 10 illustrates one embodiment of a calibration circuit with feedback compensation, H(s).

The drivers may not be inherently stable, in which case a compensating feedback loop may be required for calibration. FIG. 10 illustrates feedback compensation H(s) 1020 provided for calibration of drivers 1042, 1044. Note that the signals V1, V2 to be used during calibration are still the inputs to the drivers. H(s) can be implemented as discrete components, on an integrated circuit, or as a combination of discrete components and integrated circuitry.

Figure 11:
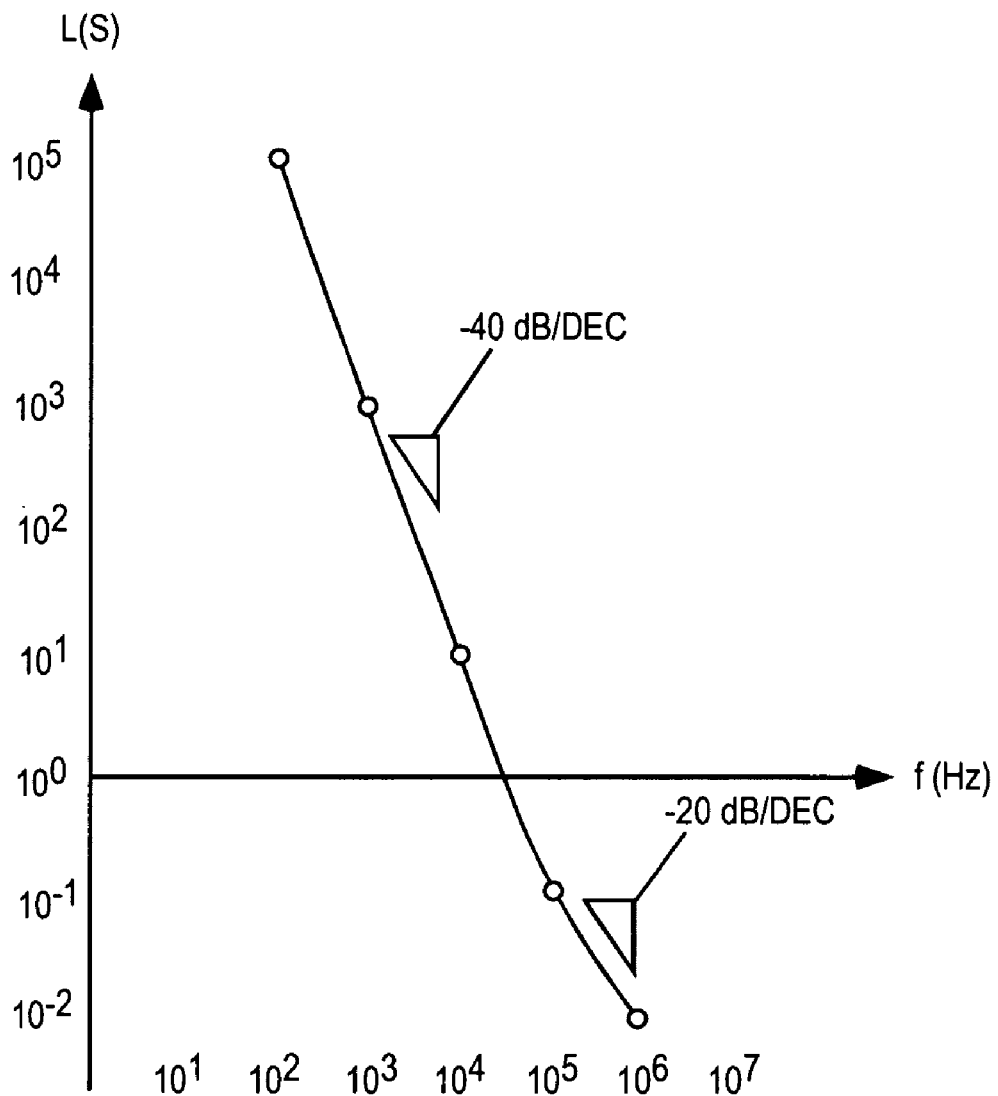
FIG. 11 illustrates one embodiment of a transfer function for the feedback compensation.

The feedback loop requires a large loop gain (e.g., $10^5$ @ 100 Hz) with a relatively low crossover frequency (e.g., 100 kHz). FIG. 11 illustrates one embodiment of a transfer function for H(s). The loop gain is on the order of $10^5$ at 100 Hz. The gain roll-off is −40 dB/decade from $10^2$ Hz to nearly $10^5$ Hz. This is readily achieved with a two active poles. A zero contributed at one-half decade prior to $10^5$ Hz (e.g., $3.16·10^4$) reduces the gain roll-off to −20 dB/decade at the cross-over frequency. The transfer function may be readily achieved with a pair of capacitors and a pair of resistors.

Figure 12:
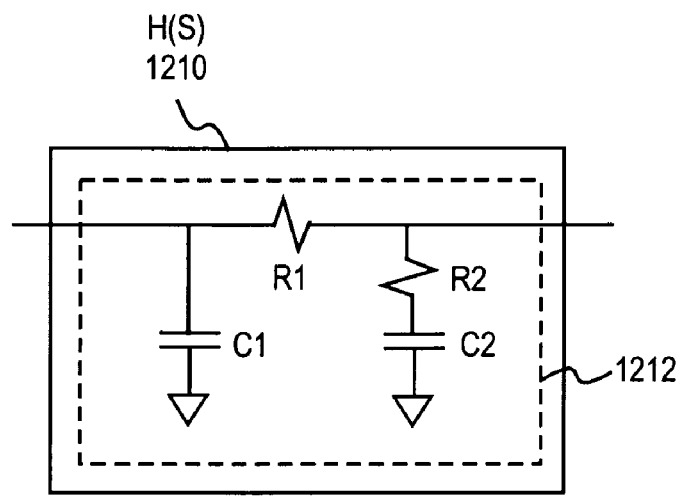
FIG. 12 illustrates one embodiment of feedback compensation circuitry.

FIG. 12 illustrates one model of the feedback compensation circuitry H(S) 1210. In one embodiment, the model components 1212 are implemented as an integrated circuit. The model components 1212 are fabricated as a portion of an integrated circuit implementation the linefeed driver 130 as illustrated in FIG. 1 in one embodiment. In an alternative embodiment, the model components 1212 are fabricated as a portion of an integrated circuit implementation of signal processor 120 as illustrated in FIG. 1.

The model of FIG. 12 may be used to determine values for R1, R2, C1, and C2 in order to achieve the transfer function of FIG. 11. However, the values required for C1 and C2 may be impractical for an integrated circuit. In such a case, C1 and C2 may be realized using capacitor multipliers for integrated circuit implementations. A capacitor multiplier uses a capacitor having a first value ($C_X$) in conjunction with active circuitry to achieve an effective capacitance of a larger second value ($C_Y = mC_X$).

Figure 13:
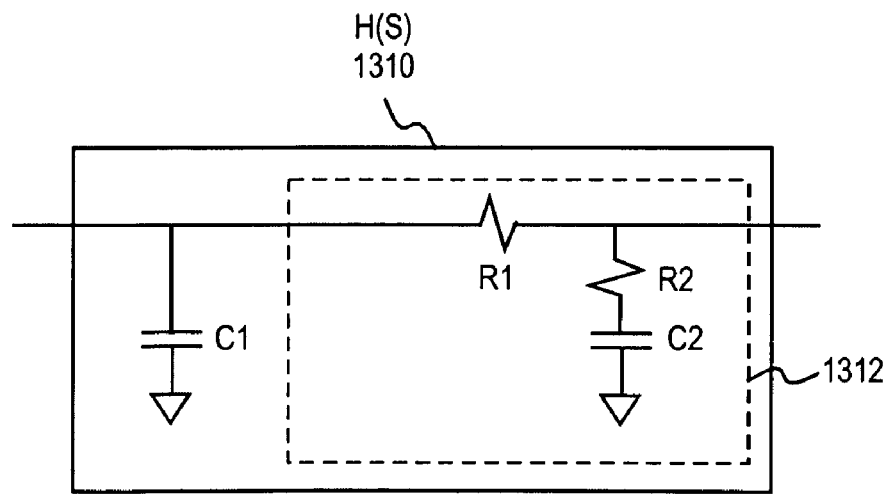
FIG. 13 illustrates an alternative embodiment of feedback compensation circuitry.

FIG. 13 illustrates another model of the feedback compensation circuitry H(S) 1310. In this embodiment, some of the model components 1312 are implemented on an integrated circuit such as the linefeed driver or the signal processor integrated circuit while other components (C1) are discrete components external from any integrated circuit. C2 may be realized using capacitor multipliers for integrated circuit implementations.

$GM_T$ and $GM_R$ may be implemented as push-pull drivers rather than bi-directional drivers. If this is the case, then a push driver must be paired with a pull driver for calibration.

Figure 14:
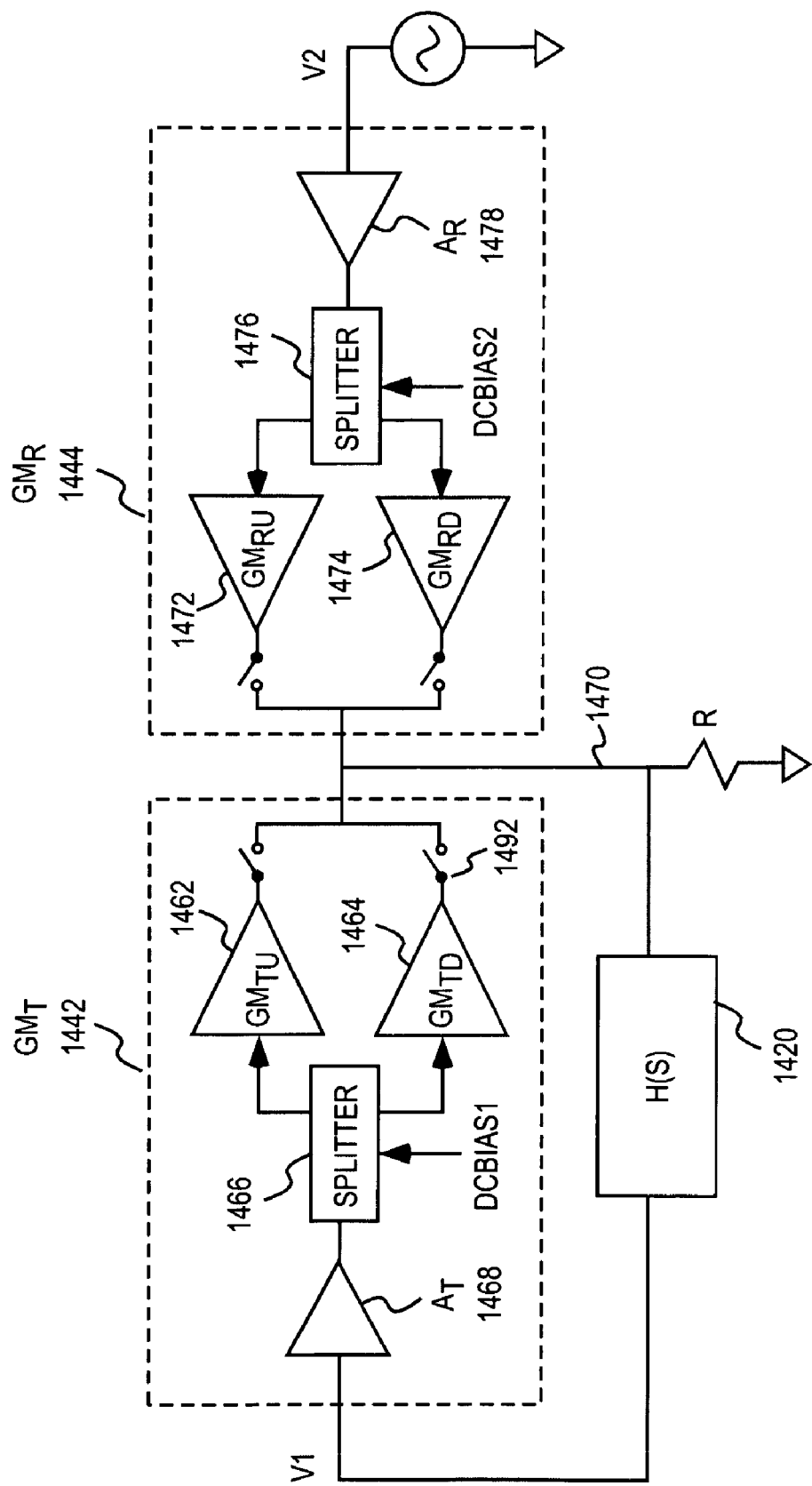
FIG. 14 illustrates a differential pair of push-pull subscriber line drivers.

FIG. 14 illustrates one embodiment of a pair of push-pull tip 1442 and 1444 ring drivers. The tip driver 1442 includes a tip push driver 1462 and a tip pull driver 1464. The ring driver 1444 includes a ring push driver 1472 and a ring pull driver 1474. One or both of the push-pull drivers may also include an associated gain element ($GM_{TUD}$ 1468, $GM_{RUD}$ 1478). These gain elements scale the input for the benefit of both the associated push and pull drivers. Each constituent driver 1464 is modeled with an associated switch 1492 for selectively feeding the common output 1470 for calibration. The common output is fed back to the input of one of the push-pull drivers. In the illustrated embodiment, the common output is fed back to the input of the tip push-pull driver via a feedback compensator 1420.

Although switches 1492 have been illustrated for conceptual simplicity, the complementary operation of the constituent drivers 1462, 1464 and 1472, 1474 is such that in one embodiment each may be chosen to selectively feed the common output by application of a DC bias (e.g., DCBIAS1, DCBIAS2) to splitters 1466, 1476. In alternative embodiment, the outputs are selectively coupled to feed the common output through the use of switches. Switches will be illustrated for conceptual simplicity, however the term "feed" rather than "coupling" will be used given that the effect may be achieved without the use of actual switches.

Figure 15:
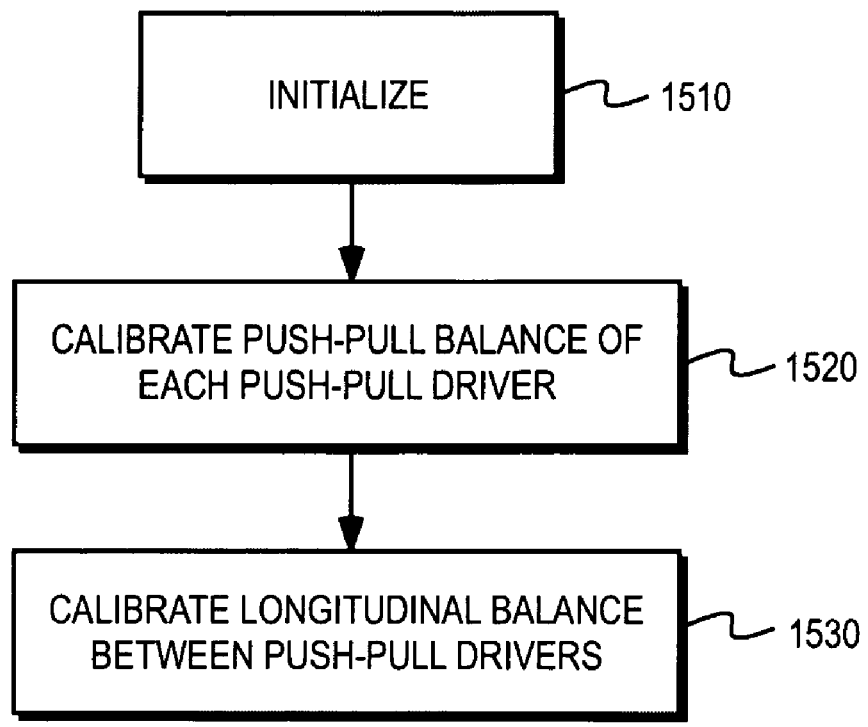
FIG. 15 illustrates one embodiment of a method for performing longitudinal balance with a push-pull driver pair of subscriber line drivers.

FIG. 15 illustrates one embodiment of the process of calibrating longitudinal balance. The calibration process is initialized in step 1510. This may entail setting various gain elements to an initial value. Setting an adjustable gain element to mid-range or to a minimum or maximum value may be required to enable the greatest range of calibration adjustment. The push-pull (i.e., up-down) balance of each push-pull driver (1442, 1444) is adjusted in step 1520. The longitudinal balance is then adjusted in step 1530. A forward longitudinal balance and a reverse longitudinal balance may be performed as subsequently described. Steps may be eliminated depending upon factors such as the accuracy with which the calibrations at any step can be made, the time required, or the operational environment. For example, the amount of calibration required for a short loop may be different than the amount of calibration required for a long loop. Although steps may be eliminated, order must be preserved. If performed at all, any push-pull balance of individual push-pull drivers should be performed prior to longitudinal balance calibration.

Figure 16:
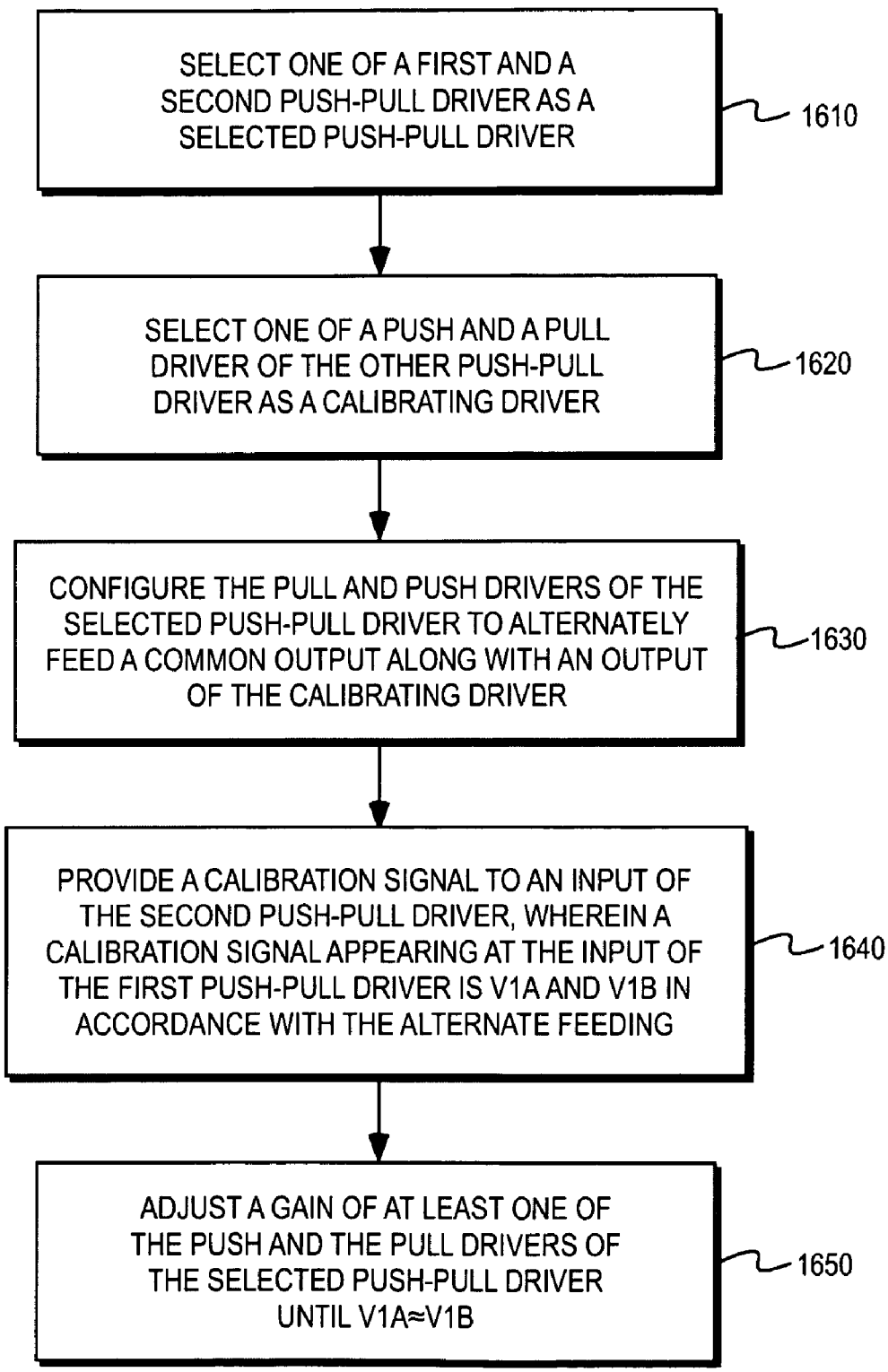
FIG. 16 illustrates one embodiment of a method of calibrating constituent drivers of a push-pull driver for push-pull balance.
Figure 17:
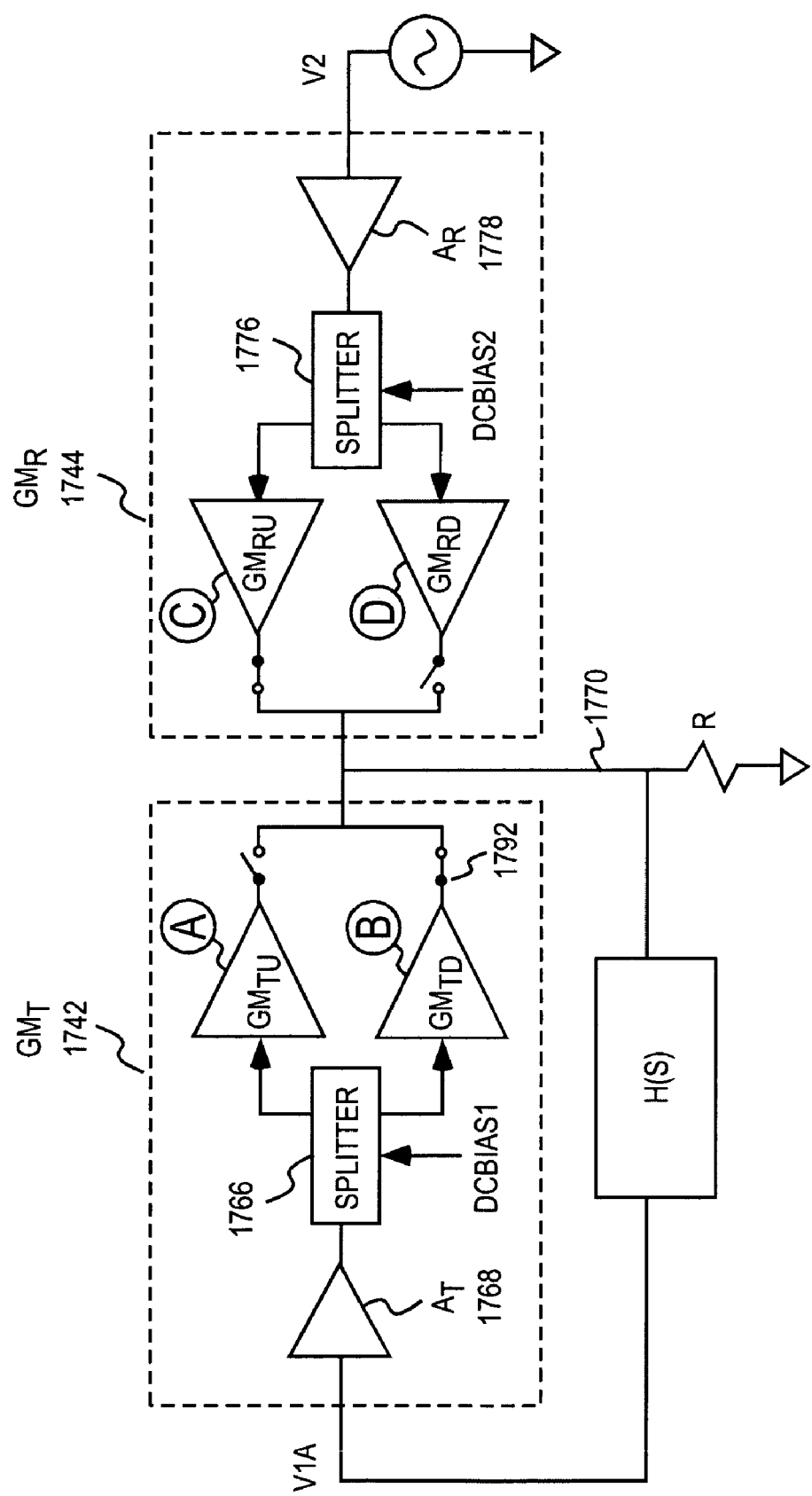
FIG. 17 illustrates one configuration of a pair of push-pull drivers configured to determine a calibration signal, V1A when calibrating a tip push-pull driver.

FIGS. 16-17 illustrate push-pull driver configurations for calibrating each push-pull driver. For ease of reference, the constituent push or pull drivers of each push-pull driver have been assigned letters A, B, C, and D to simplify the description of the process for calibrating each push-pull driver set forth in FIG. 18.

The purpose of this calibration is to ensure that the push driver and the pull driver for each push-pull driver behave in a matched complementary fashion, at least within the resolution of calibration. If the push driver responds to a first signal to produce a first result, then the pull driver should produce the complement to the first result in response to the complement to the first signal.

Referring to step 1610 of FIG. 16, one of a first and a second push-pull driver is selected as a selected push-pull driver. In step 1620, one of a push driver and a pull driver of the other push-pull driver is selected as a calibrating driver. The push driver of the other push-pull driver may be selected as the calibrating driver, for example.

In step 1630, the push driver and the pull driver of the selected push-pull driver are configured to alternately feed a common output along with an output of the calibrating driver. The common output is fed back to the first push-pull driver.

In step 1640, a calibration signal is provided to the input of the second push-pull driver. The calibration signal appearing at the input of the first push-pull driver is V1A and V1B in accordance with the alternate feeding. Thus, if the calibration signal appearing at the input of the first push-pull driver when the pull driver of the selected push-pull driver feeds the common output is V1A, then the calibration signal appearing at the input of the first push-pull driver when the push driver of the selected push-pull driver feeds the common output is V1B.

A gain of at least one of the push driver and the pull driver of the selected push-pull driver is adjusted in step 1650 until V1A≈V1B (i.e., V1A is substantially the same as V1B).

FIG. 17 illustrates calibration of the constituent drivers (A, B) of the tip push-pull driver 1742 using the push driver (C) of the ring push-pull driver 1744 as the calibrating driver of the other push-pull driver. The output of the pull driver (B) of the tip push-pull driver feeds the common output 1770 along with the output of the calibrating driver (C) to the exclusion of the outputs of push driver (A) of the tip push-pull driver and the pull driver (D) of the ring push-pull driver. The common output is fed back to the input of the tip push-pull driver 1742. Adjustable gain elements may be set to mid-range or to the top or bottom of their respective variable ranges in order to provide the greatest range of calibration.

Figure 18:
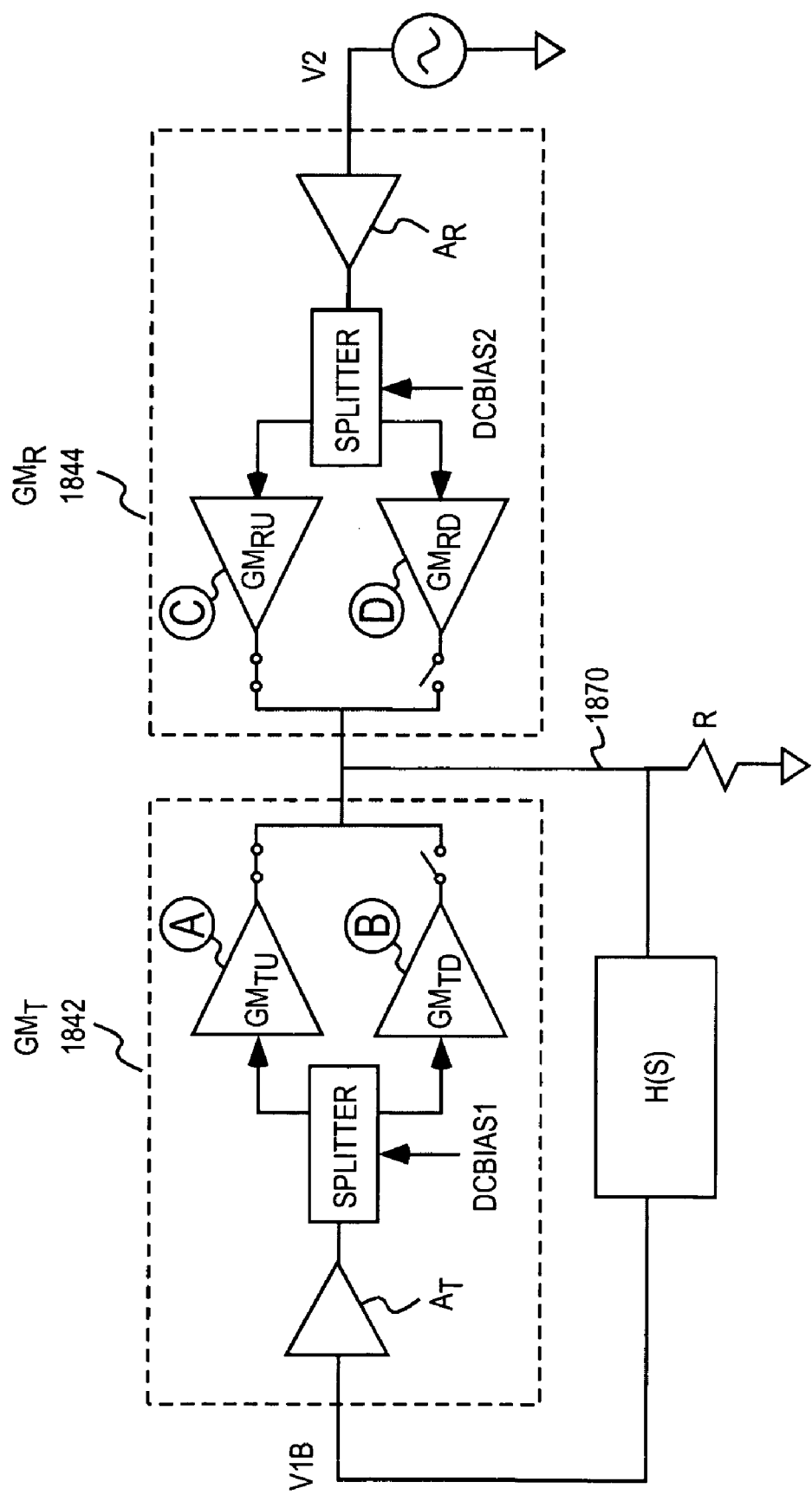
FIG. 18 illustrates another configuration of the pair of push-pull drivers configured to determine a calibration signal, V1B when calibrating the tip push-pull driver.

A calibration signal (V2) is provided to the input of the ring push-pull driver. A calibration signal (V1A) appearing at the input of the tip push-pull driver 1742 is measured when the first pull driver (B) and the second push driver (C) feed the common output 1770. The constituent driver of push-pull driver 1742 feeding the common output is alternated from the pull driver (B) to the push driver (A) as illustrated in FIG. 18. Referring to FIG. 17, this re-configuration is accomplished in various embodiments through the use of switches 1792 or by applying a different bias (DCBIAS1, DCBIAS2) to splitters 1766, 1776 to inhibit the applicable push or pull drivers from feeding the common output. In various embodiments, the DCBIAS may be provided by any of the gain elements not being calibrated.

Referring to FIG. 18, the first push driver (A) feeds the common output 1870 along with the calibrating driver (i.e., the second push driver (C)). In one embodiment, pull-driver B serves to provide the DCBIAS1. The calibration signal (V1B) appearing at the input of the tip push-pull driver 1842 as a result of the calibration signal (V2) provided to the input of the second push-pull driver 1844 is measured. A gain of the first push driver (A) is adjusted until V1A≈V1B.

Figure 19:
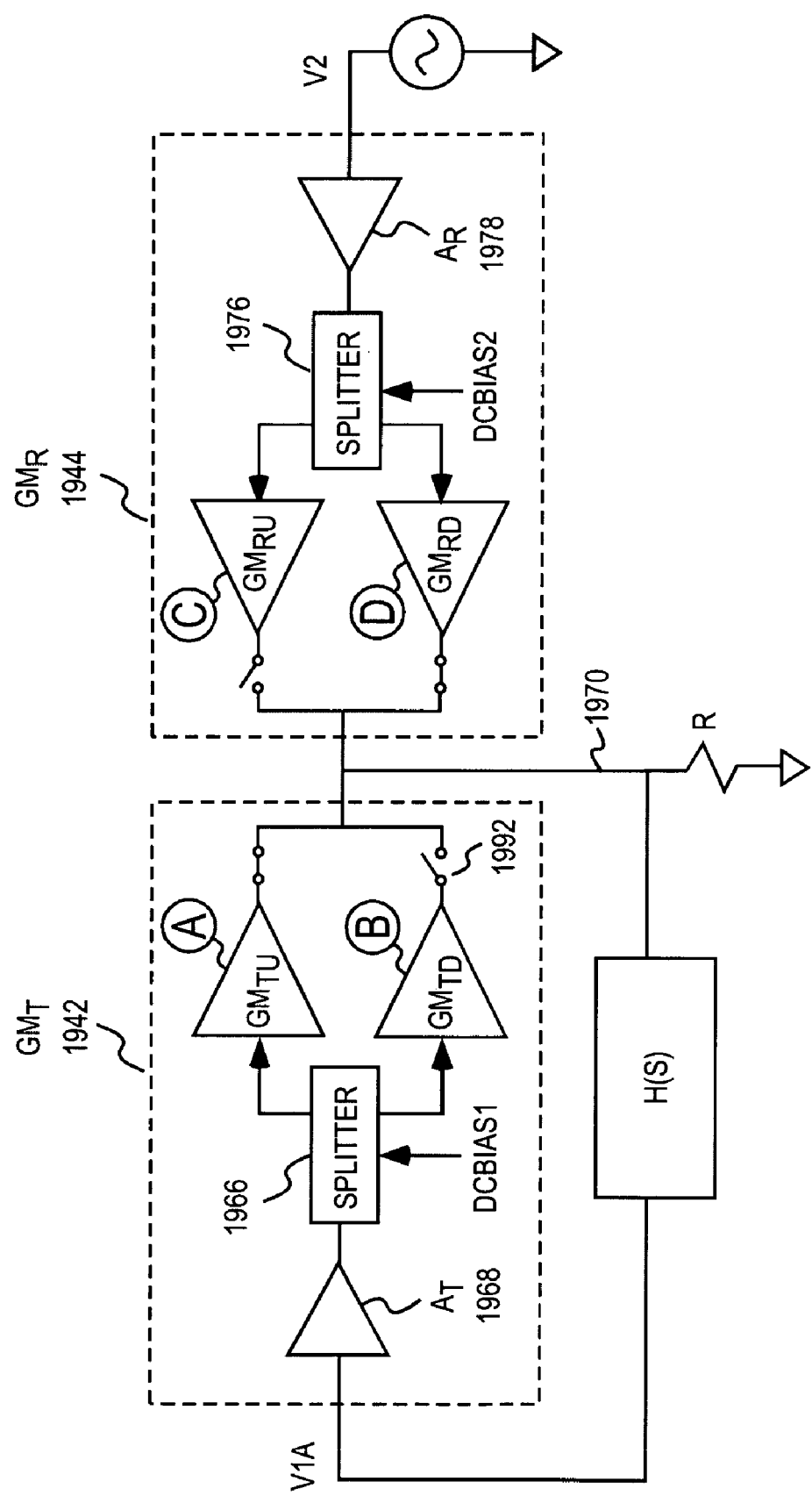
FIG. 19 illustrates one configuration of a pair of push-pull drivers configured to determine a calibration signal, V1A when calibrating a ring push-pull driver.
Figure 20:
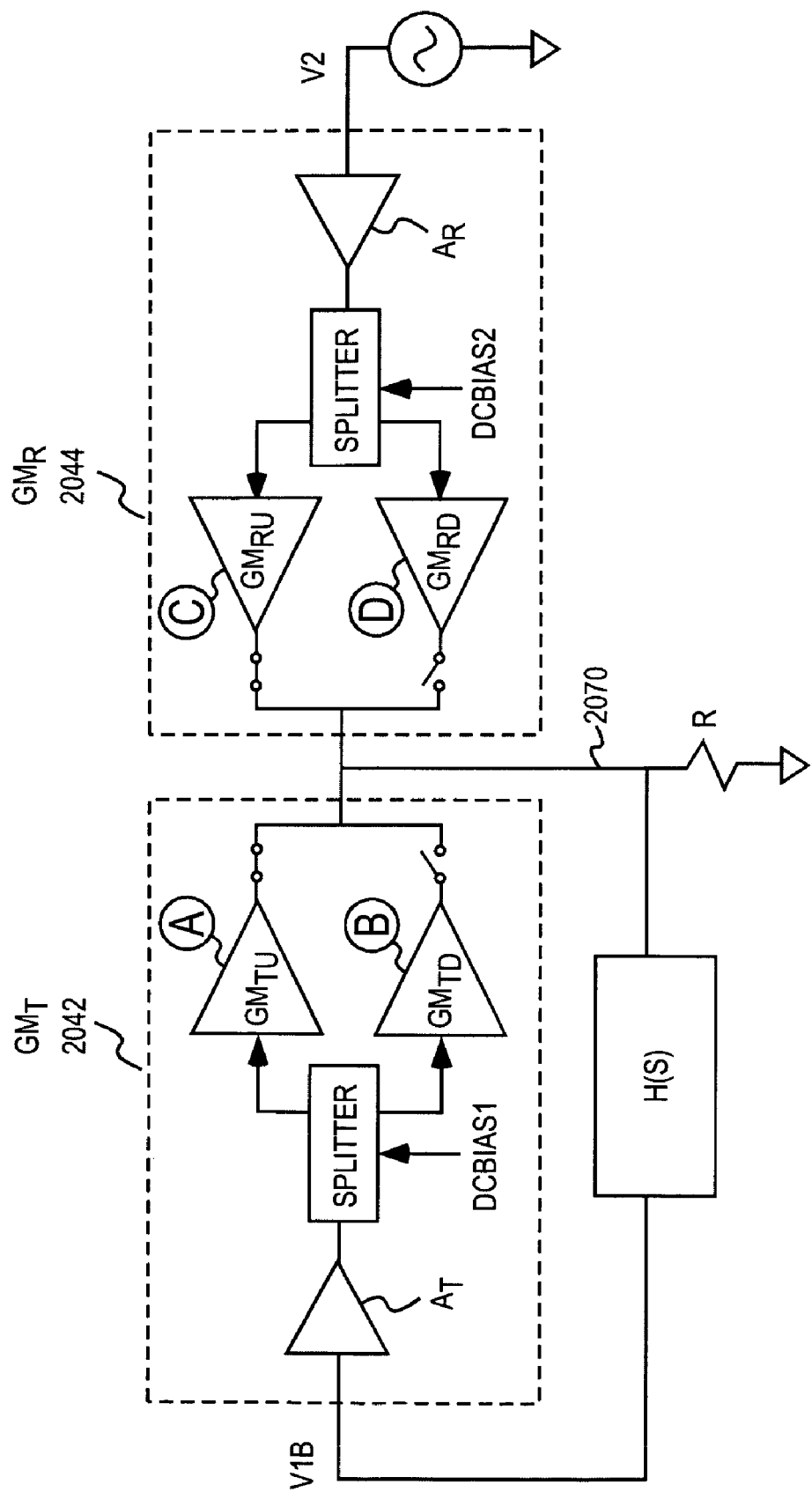
FIG. 20 illustrates another configuration of the pair of push-pull drivers configured to determine a calibration signal, V1B when calibrating the ring push-pull driver.

FIGS. 19-20 illustrate one embodiment of the application of the process of FIG. 16 when the ring push-pull driver 1944 is the selected push-pull driver. The constituent drivers (C, D) of the ring push-pull driver 1944 are calibrated using the push driver (A) of the tip push-pull driver 1942 as the calibration driver.

The output of the pull driver (D) of the ring push-pull driver feeds the common output 1970 along with the output of the calibrating driver (A). The common output is fed back to the input of the tip push-pull driver 1942.

A calibration signal (V2) is provided to the input of the ring push-pull driver. A calibration signal (V1A) appearing at the input of the tip push-pull driver 1942 is measured when the first push driver (A) and the second pull driver (D) feed the common output 1970 to the exclusion of the first pull driver (B) and the second push driver (C). The constituent driver of push-pull driver 1944 feeding the common output is alternated from the pull driver (D) to the push driver (C) as illustrated in FIG. 20. Referring to FIG. 19, this re-configuration is accomplished in various embodiments through the use of switches 1992 or by applying a different bias (DCBIAS1, DCBIAS2) to splitters 1966, 1976.

Referring to FIG. 20, the second push driver (C) feeds the common output 2070 along with the calibrating driver (i.e., the first push driver (A)). The calibration signal (V1B) appearing at the input of the tip push-pull driver 2042 as a result of the calibration signal (V2) provided to the input of the second push-pull driver 2044 is measured. A gain of the second push driver (C) is adjusted until V1A≈V1B.

Figure 21:
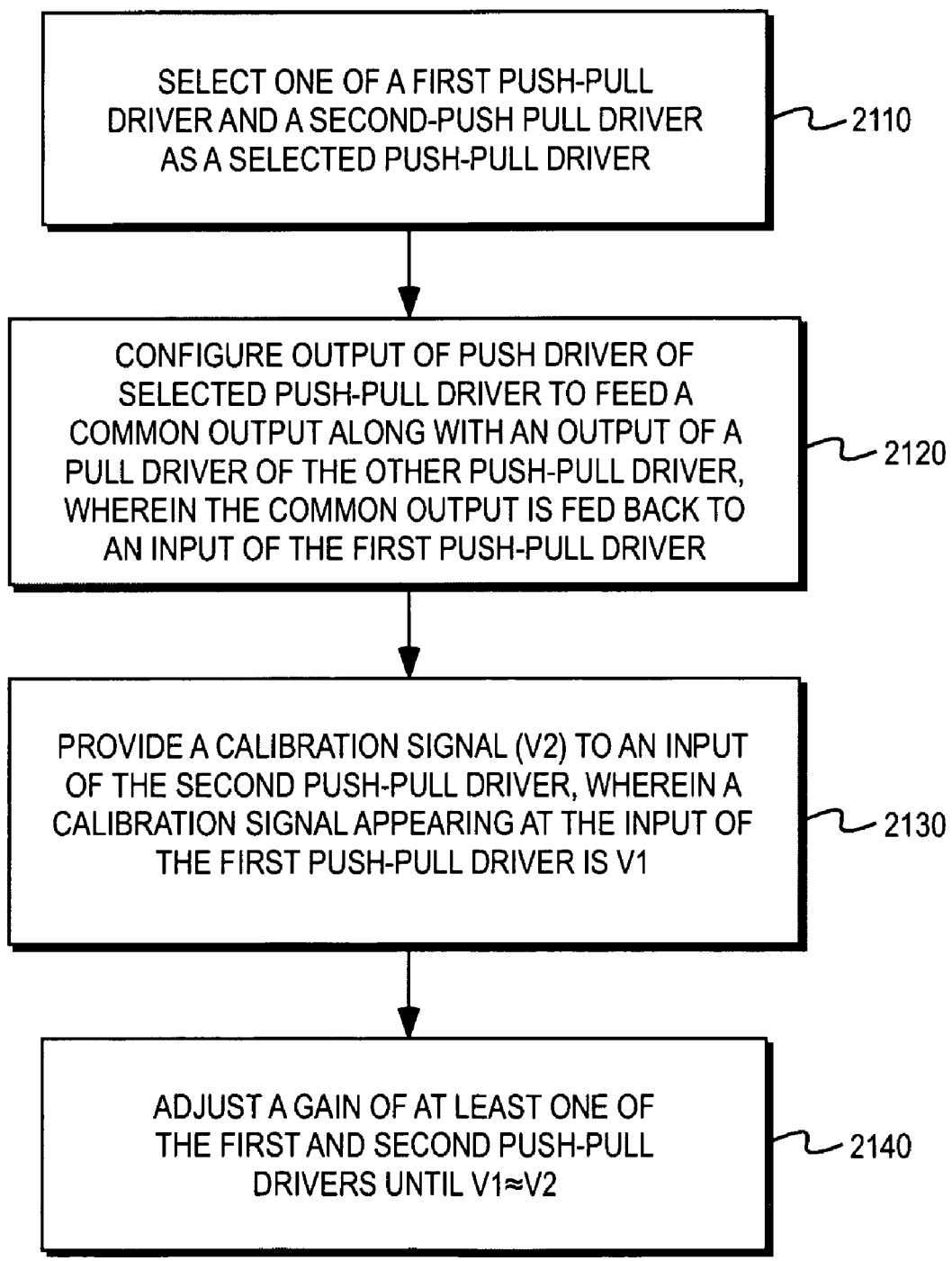
FIG. 21 illustrates one embodiment of a method of calibrating a longitudinal balance for a differential pair of push-pull drivers.

Once each push-pull driver is calibrated, the longitudinal balance may be calibrated. Referring to FIG. 21, one of the first and the second push-pull drivers is chosen as a selected push-pull driver in step 2110. Generally this determination is dependent upon whether the SLIC is configured to operate in a forward mode or a reverse mode.

In the forward mode, the tip line is generally associated with the most positive of the tip and ring lines. The roles of the tip and ring lines are swapped in the reverse mode such that the ring line is the most positive. If the SLIC is operating in a forward mode, then the selected push-pull driver is the tip push-pull driver.

In step 2120, the output of the push driver of the selected push-pull driver is configured to feed a common output along with an output of a pull driver from the other push-pull driver. The common output is fed back to an input of the first push-pull driver. FIG. 17 illustrates one embodiment of the configuration for longitudinal balance calibration when operating in a reverse mode. FIG. 19 illustrates one embodiment of the push-pull driver configuration for longitudinal balance calibration when operating in a forward mode.

A calibration signal (V2) is applied to an input of the second push-pull driver in step 2130. The calibration signal appearing at the input of the first push-pull driver is V1. Referring to FIG. 17 or 19, V1A corresponds to V1. A gain of at least one of the first and the second push-pull drivers is varied until V1≈V2 in step 2140.

The adjustment of the gain of the first (1742, 1942) and second (1744, 1944) push-pull drivers is accomplished by varying one of $A_T$ (1768, 1968) or $A_R$ (1778, 1978). As a practical matter, various embodiments might only provide for one of $A_T$ or $A_R$. In such a case, the available push-pull driver gain element (i.e., $A_T$ or $A_R$) is adjusted.

The sampling and spectral transform approach set forth in FIG. 9 may be used for determining the substantial equality of any of the sensed signals. For example, V1A and V1B may be computed by sampling V1 using ADC 950 prior to (V1A) and after (V1B) re-configuration of the drivers feeding the common output. V1A and V1B may be computed as spectral transforms of the sampled signals. In various embodiments, the substantial equality of any of the described V1, V1A, V1B, and V2 is determined from a comparison of a spectral transform of the corresponding analog signals. The spectral transform may be a Fourier transform, discrete cosine transform (DCT), discrete sine transform (DST), etc. In one embodiment, the transform is a specialized case of the Fourier transform selected for computational efficiency. Such specialized cases impose computational constraints (e.g., the number of points of calculation) that are acceptable for the present application. In one embodiment, the Goertzel transform is selected for the spectral transformation. In one embodiment, the spectral transform and the requisite comparisons are performed on the sampled signals by the signal processor.

Various methods and apparatus for calibrating drivers including bi-directional drivers and push-pull drivers to achieve longitudinal balance have been described. In addition, the use of secondary drivers modeling primary drivers has been introduced as a technique for calibrating the primary drivers.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method comprising:
   (a) providing a first and a second driver of a differential driver pair for driving a subscriber line, wherein an output of each of the first and second drivers is coupled to a common output, wherein the common output is coupled to an input of the first driver;
   (b) adjusting a gain of at least one of the first and second drivers until a calibration signal (V1) present at the input of the first driver is substantially the same as a calibration signal (V2) present at the input of the second driver, wherein the calibration signal present at the input of the first driver and the calibration signal present at the input of the second driver have a dominant spectral component.

2. The method of claim 1 further comprising:
   (c) applying the calibration signal (V2) to the input of the second driver to stimulate the driver pair with the calibration signal.

3. The method of claim 2 wherein the calibration signal has a single dominant frequency.

4. The method of claim 1 wherein the dominant spectral component is located within a range of approximately 60 Hz to 320 Hz.

5. The method of claim 1 wherein each of the first and second drivers is a scaled model of a primary differential driver pair, wherein the first and second drivers form a secondary differential driver pair, wherein the primary differential driver pair drives the subscriber line.

6. The method of claim 1 wherein the coupling to the first input includes a feedback compensator.

7. The method of claim 1 wherein the first driver comprises a first push driver and a first pull driver, wherein the second driver comprises a second push driver and a second pull driver, comprising:
   i) configuring outputs of each of the first push driver and the second pull driver to feed the common output; and
   ii) configuring outputs of the first pull driver and the second push driver to not feed the common output.

8. The method of claim 7 wherein b) further comprises:
   iii) varying the gain of at least one of the first push driver and the second pull driver until the calibration signal at the input of the first driver is substantially the same as the calibration signal at the input of the second driver.

9. The method of claim 1 wherein the first driver comprises a first push driver and a first pull driver, wherein the second driver comprises a second push driver and a second pull driver, comprising:
   i) configuring outputs of the first pull driver and the second push driver to feed the common output, wherein the first push driver and the second pull driver do not feed the common output; and
   ii) measuring a calibration signal (V1A) appearing at an input of the first driver;
   iii) configuring outputs of the first push driver and the second push driver to feed the common output, wherein the first and second pull drivers do not feed the common output; and
   iv) varying a gain of the first push driver until V1A=V1B, wherein V1B is a calibration signal (V1B) appearing at the first driver input.

10. The method of claim 1 wherein b) comprises performing a spectral transform.

11. The method of claim 1 wherein b) comprises performing a Goertzel Discrete Fourier Transform to measure V1 and V2.

12. An apparatus comprising:
   a first and a second driver of a differential driver pair for driving a subscriber line, wherein an output of each of the first and second drivers is coupled to feed a common output, wherein the common output is fed back to an input of the first driver; and
   a signal processor coupled to adjust a gain of at least one of the first and second drivers until a calibration signal (V1) present at the input of the first driver is substantially the same as a calibration signal (V2) present at the input of the second driver, wherein the calibration signal present at the input of the first driver and the calibration signal present at the input of the second driver have a dominant spectral component.

13. The apparatus of claim 12 further comprising a digital-to-analog converter coupled to provide a generated calibration signal to the input of the second driver.

14. The apparatus of claim 13 wherein the generated calibration signal has a single dominant frequency.

15. The apparatus of claim 12 wherein the dominant spectral component is located within a range of 60-320 Hz.

16. The apparatus of claim 12 wherein each of the first and second drivers is a scaled model of a primary differential driver pair, wherein the first and second drivers form a secondary differential driver pair, wherein the primary differential driver pair drives the subscriber line.

17. The apparatus of claim 12 further comprising:
   a feedback compensator, wherein the feedback compensator couples the common output to the input of the first driver.

18. The apparatus of claim 17 wherein the feedback compensator includes a capacitance generated by a capacitor multiplier.

19. The apparatus of claim 12 wherein the first driver comprises a first push driver and a first pull driver, wherein the second driver comprises a second push driver and a second pull driver, wherein the first pull driver, first push driver, second pull driver, and second push driver have outputs that may be configured to selectively feed the common output.

20. The apparatus of claim 19 wherein the output of each of the first push driver and the second pull driver is configured to feed the common output, wherein the outputs of the first pull driver and the second push driver are configured to not feed the common output, wherein the processor varies the gain of at least one of the first push driver and the second pull driver until the calibration signal at the input of the first driver is substantially the same as the calibration signal at the input of the second driver.

21. The apparatus of claim 19 wherein the processor varies a gain of the first push driver until V1A=V1B, wherein V1B is a calibration signal appearing at the first driver input when outputs of each of the first push driver and second push driver are configured to feed the common output to the exclusion of the first pull driver and the second pull driver, wherein V1A is a calibration signal appearing at the first driver input when outputs of the first pull driver and second push driver are configured to feed the common output to the exclusion of the first push driver and second pull driver.

22. The apparatus of claim 12 wherein the signal processor further comprises an analog-to-digital converter to sense the input of each of the first and second drivers.

23. The apparatus of claim 22 wherein the signal processor performs a discrete Fourier transform (DFT) on the sensed inputs to measure a calibration signal content.

24. The apparatus of claim 23 wherein the DFT is a Goertzel DFT.

* * * * *